Nov. 8, 1960 G. A. HEILMAN 2,959,231
IN ROW-STRADDLE ROW CULTIVATOR
Filed May 22, 1957 2 Sheets-Sheet 1
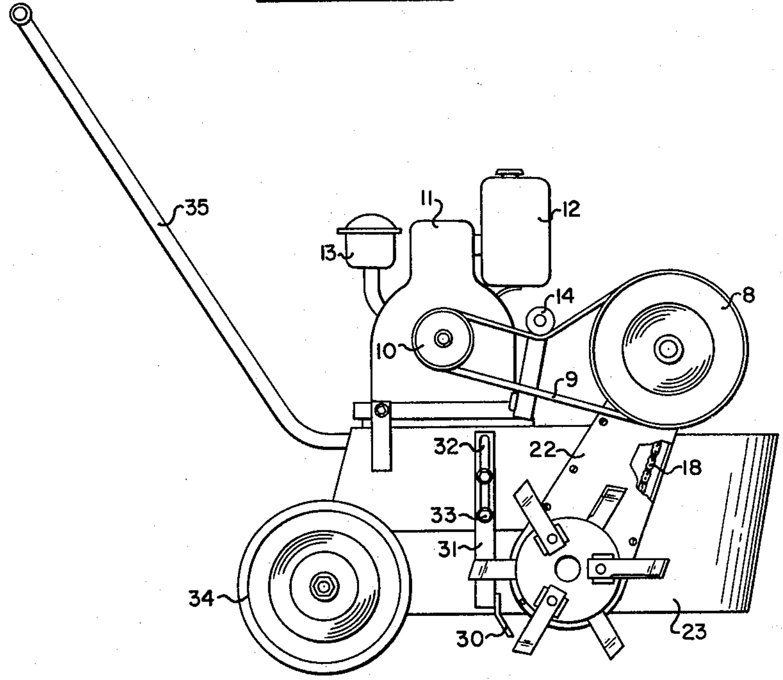
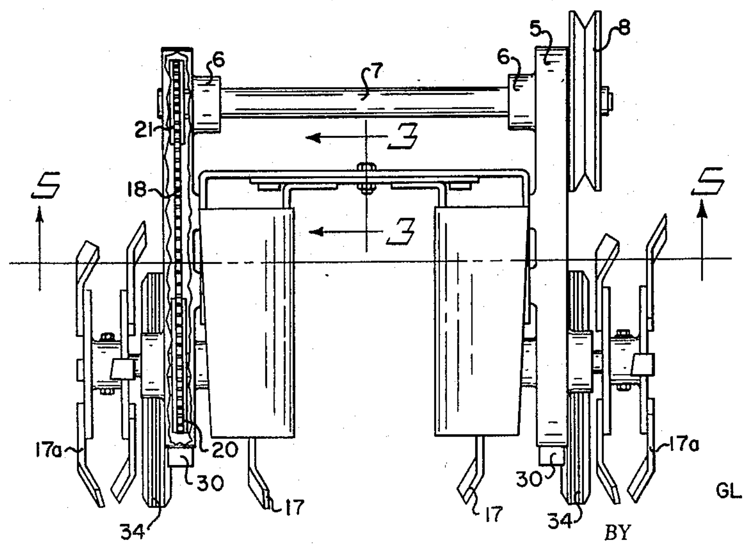
INVENTOR.
GLENN A. HEILMAN
BY
DES JARDINS & ROBINSON
by Albert F. Robinson
HIS ATTORNEYS Nov. 8, 1960 G. A. HEILMAN 2,959,231
IN ROW-STRADDLE ROW CULTIVATOR
Filed May 22, 1957 2 Sheets-Sheet 2
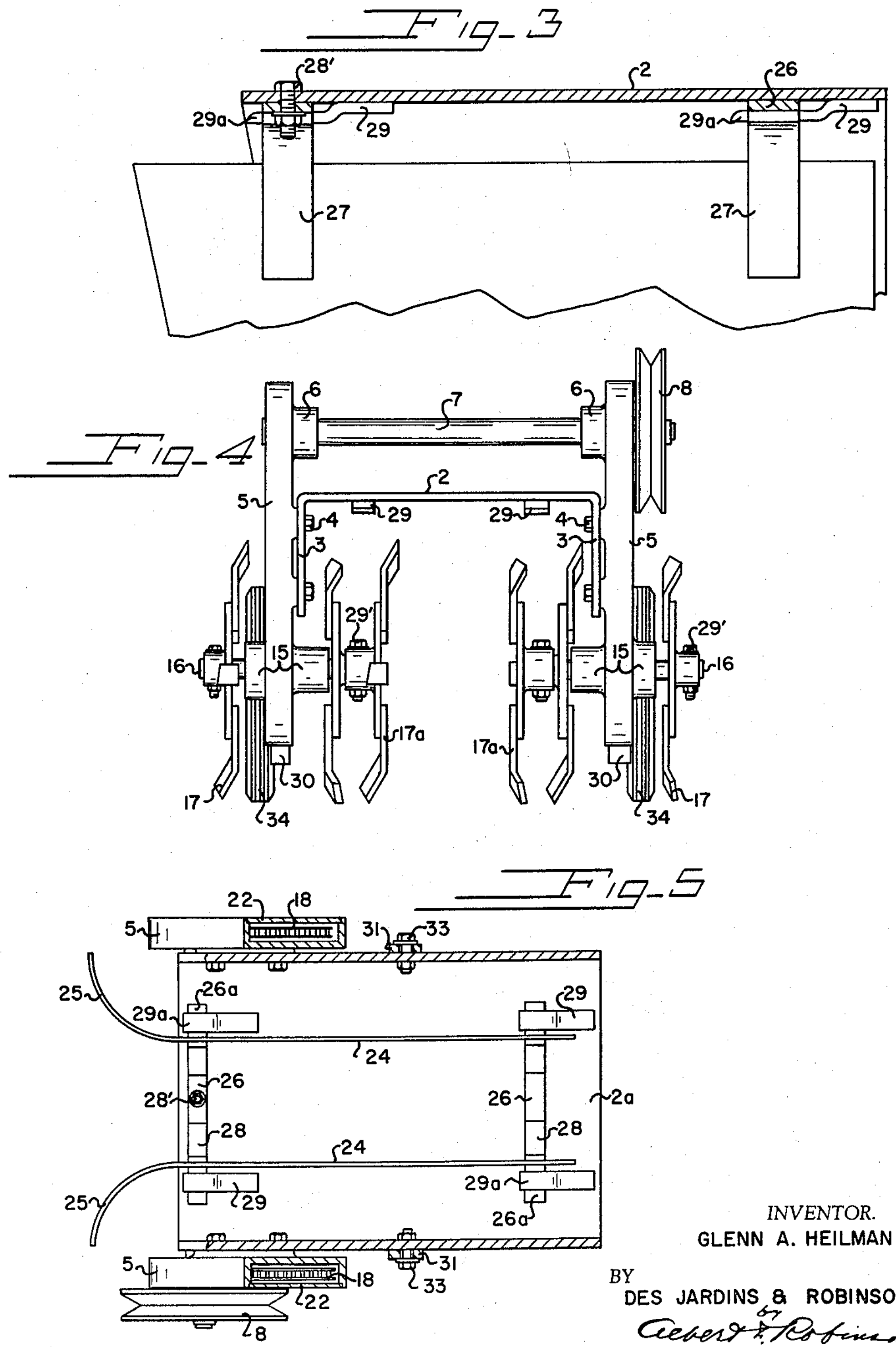
INVENTOR.
GLENN A. HEILMAN
BY
DES JARDINS & ROBINSON
by Albert F. Robinson
HIS ATTORNEYS United States Patent Office 2,959,231

Patented Nov. 8, 1960

2,959,231

IN ROW-STRADDLE ROW CULTIVATOR

Glenn A. Heilman, 110 W. Union St., Liberty, Ind.

Filed May 22, 1957, Ser. No. 660,841

3 Claims. (Cl. 172—42)

This invention relates to an agricultural earth tilling implement, and more particularly to a combination disc harrow and cultivator which may be selectably converted to either by certain interchangeable parts and attachments.

More specifically, the invention relates to a combination disc harrow and cultivator having tines or discs rotatably mounted on a plurality of stub shafts which are spaced-apart transversely in axial alignment, and having one of the tines or discs of each of the shafts interchangeable for being fitted to either of the opposite ends of said shaft. The stub shafts are mounted on a wheeled frame or body member carrying a motor and suitable driving connections to said shafts. With the interchangeable discs or tines disposed on the outer ends of the shafts, the inner ends of said shafts are spaced apart to provide a chamber or space for straddling a row of growing plants and in which a unit may be detachably mounted for gathering in their extended foliage from between the rows being cultivated. The wheels are mounted on the frame or body member at the rear of the tines or discs, and the motor is mounted on the top of the frame or body about midway between the wheels and the stub axles for the tines or discs. With the motor so disposed, the weight of the device may be readily tilted to or from the discs or tines by leverage of the guiding handle at the rear of the device.

A plurality of stationary diggers are provided at the rear of the discs or tines adjustably mounted on opposite sides of the frame or body. These are preferably disposed in position to substantially track the interchangeable discs when they are placed on the inner ends of the stub shafts.

This device is a small compact unit and may be readily converted into a cultivator or harrow by simply interchanging certain of the parts and adding a readily detachable accessory unit if desired.

One of the main objects of the invention is a tractor or tiller for cultivating astride or between rows of plants.

Another object of the invention is a tractor or tiller provided with means for protecting the plant when cultivating astride the plant rows.

Another object of the invention is a combination harrow and cultivator which is simple in construction and efficient in operation.

Another object of the invention is a combination harrow and cultivator which may be converted to either by interchanging some of the parts.

Another object of the invention is a combination harrow and cultivator constructed so that the weight of the machine is easily shifted to vary the tilling depth.

Another object of the invention is a combination harrow and cultivator in which certain tines or discs are interchangeable for converting the device to either a cultivator or harrow.

Further objects, and objects relating to details of construction and economies of operation, will readily appear on the detailed description to follow. In one instance, the objects of the invention have been accomplished by the device and means set forth in the following specification. The invention is clearly defined and pointed out in the appended claims. A structure constituting a preferred embodiment of the invention is illustrated in the accompanying drawings, forming a part of this specification, in which:

Fig. 1 is a side elevation of the device assembled for use as a cultivator and equipped with a detachable accessory for gathering in the foliage of the plants in from between the rows being cultivated.

Fig. 2 is a front elevation of the device assembled as in Fig. 1.

Fig. 3 is an enlarged detail view on line 3—3 of Fig. 2 looking in the direction of the arrows.

Fig. 4 is a front elevation of the device, similar to Fig. 2, with the device assembled for use as a harrow.

Fig. 5 is a cross-sectional view on line 5—5 of Fig. 2 looking in the direction of the arrow.

Referring specifically to the drawings, in which like numerals designate like parts, numeral 2 is an inverted U-shaped metal frame with opposite side flanges 3 disposed downwardly and bolted at 4 to opposite side plate members 5 which, with the member 2, make up the body of the device which is of a channel construction with the channel opening downwardly.

The top ends of the side members 5 are provided with bearings 6 in which is journaled a drive shaft 7 having a pulley 8 fixed at one end to be driven by a transmission belt 9 connected to a drive pulley 10 of an internal combustion engine 11 which is mounted on top of the frame 2, together with a conventional gas tank 12 and muffler 13. The transmission belt 9 is tightened by a member 14 adjustably pivoted to the frame.

Mounted on the bottom of the side members 5 are a pair of bearings 15 spaced apart in axial alignment for a stub shaft 16 to be rotatably journaled in each. To each of the stub shafts 16 is fixed a series of rotatable tines or discs 17, three being shown on each shaft. One tine or disc **17*a* unit is detachably connected with each stub shaft 16** so that it may be fitted to either of its opposite ends.

There is a transmission chain or belt 18 between a pulley 20 on each of the stub shafts 16 and a pulley 21 on the opposite ends of the top drive shaft 7, said transmission chain or belt being covered by a conventional guard 22. There is a transmission chain or belt for each stub shaft.

The implement as assembled in Figs. 1 and 2 for use as a cultivator has the discs or tines **17*a* disposed on the outer end of each of the stub shafts 16. This results in a substantial space between the inner ends of the shafts and within the channel of the member 2, said space or chamber being without any obstruction when the device is straddled over a row of plants. Within the frame 2, there is detachably mounted an accessory unit 23 having downwardly extending side walls 24 spaced apart and with their forward ends 25 outwardly flared. These side walls 24 are connected to a pair of top cross bars 26 by front and rear brackets 27 having top flanges 28 which are attached to the cross bars 26 as by welding. The opposite ends 26*a* of the cross bars 26 are adapted to be engaged by four clips 29 which are fastened to the top wall 2*a* of frame 2 with their ends 29*a* offset to provide open sockets into which the opposite ends 26*a* of the cross bars 26 are adapted to be inserted. This permits the accessory unit 23 to be readily inserted and removed from the frame 2, and it may be secured in place on said frame 2 by a bolt 28′ projecting through the top wall 2*a* of member 2 and one of the bars 26, preferably the front one. This accessory unit 23 with its outwardly flared forward ends gather in the foliage of the plants of the straddled row away from the path of the discs or tines which travel between the rows. Some plants, such as corn or the like which does not have much foliage when small, can be cultivated without the accessory unit 23. The channel of member 2** will alone provide ample protection for the plants.

When the implement is to be used as a harrow, rather than as a cultivator, the accessory unit 23 is removed and the tines or discs 17*a* are mounted on the inner ends of the stub shafts 16 as shown in Fig. 4 rather than on their outer ends as shown in Fig. 2. These discs or tines 17*a* are readily detachably connected by any suitable means, such as bolt 29′ projecting through the hub of the disc and said stub shaft.

Additional stationary diggers 30 may also be mounted on the opposite sides of the frame member 2 by holders 31 having vertical elongated slots 32 to be vertically adjusted and clamped in position by bolts 33.

To the rear of the frame of the device are mounted a pair of wheels 34 for permitting the device to be wheeled about by means of the handle 35. These wheels 34 are placed to the rear of the tines or cutter, and the engine is mounted at the top of the device, between the tines or cutters and the wheels. So positioned, the cutting depth of the tines or discs can be easily regulated by leverage of the handle. Bearing down upon the free end of the handle, with the wheels as the fulcrum, the weight of the machine can be easily thrown off center forwardly or rearwardly as desired. Then too, by tilting the device backwardly, it way be easily wheeled about from place to place. The wheels are vertically adjustable on the body member 2.

From the foregoing description of the device, it will be seen that the device can be easily converted into a harrow or cultivator as may be desired. By simply placing the detachable tines or discs 17*a* on the outer ends of of the stub shafts 16, the device is adapted for cultivating between the rows of growing plants. The accessory unit 23 can be added, if necessary, for protecting the plants from the tines or discs. Plants, such as corn and the like which do not spread out to any substantial extent may be cultivated with or without use of the accessory unit. However, for plants with spreading foliage, the accessory unit 23 can be advantageously used for gathering in the foliage away from the paths of the tines or discs. To convert the device to a harrow, all that is necessary to do is to detach the accessory unit 23 and place the detachable tines or discs 17*a* on the inner ends of the stub shafts 16. Accordingly, the device readily lends itself to use either as a harrow or cultivator by very minor changes. Whether the device be used as a harrow or cultivator, the center of gravity of the machine is low so that it does not tip in operation, and the weight is balanced about the wheels so that it can be readily thrown forward onto the discs or tines or backward upon the wheels by manuipulation of the handle. Furthermore, with the weight so balanced, the device can be wheeled about when not in use.

I am aware that there may be various changes in details of construction without departing from the spirit of the invention, and, therefore, the invention is claimed broadly as indicated by the appended claims.

Having thus described my invention, what I claim as new and useful and desire to secure by United States Letters Patent is:

1. An earth tilling implement convertible for use as a cultivator or harrow comprising a body frame member provided with transversely spaced-apart side supports, a stub shaft mounted on each of said supports and disposed in axial alignment with inner ends thereof substantially spaced-apart, a series of rotatable discs mounted on each of the stub shafts, one disc of each series being interchangeable for being mounted on either of the opposite ends of said stub shaft and providing an unobstructed lengthwise and transverse central space between the inner ends of the shafts when said interchangeable discs are mounted on either ends of the stub shafts, and a plant protecting unit readily detachably mounted to the body member within said space between the inner ends of the stub shafts.

2. The earth tilling cultivator of claim 1 in which the plant protecting unit is provided with transversely spaced-apart side walls having outwardly flared forward ends.

3. The earth tilling cultivator of claim 1 in which the plant protecting unit is a channel member of substantially uniform depth with the channel opening extending downwardly.

References Cited in the file of this patent

UNITED STATES PATENTS

| | | |
|---|---|---|
| 1,495,113 | Schneider | May 20, 1924 |
| 1,664,789 | Von Meyenburg | Apr. 3, 1928 |
| 2,176,261 | Kelsey | Oct. 17, 1939 |
| 2,250,391 | Ober | July 22, 1941 |
| 2,689,510 | Petermann | Sept. 21, 1954 |
| 2,847,924 | Quick | Aug. 19, 1958 |